United States Patent [19]
Potthoff et al.

[11] Patent Number: 6,059,272
[45] Date of Patent: May 9, 2000

[54] LIQUID DISTRIBUTOR

[75] Inventors: Richard W. Potthoff, Scotch Plains, N.J.; Ramachandran Krishnamurthy, Chestnut Ridge, N.Y.

[73] Assignee: The BOC Group, Inc., Murray Hill, N.J.

[21] Appl. No.: 09/079,654

[22] Filed: May 15, 1998

[51] Int. Cl.[7] .............. B01D 1/14; B01D 47/16; B01F 3/04

[52] U.S. Cl. .............. 261/97; 159/43.1; 202/158; 261/110; 261/114.5; 261/DIG. 44

[58] Field of Search .............. 202/158; 159/28.6, 159/43.1, 14, 15; 261/112.2, 110, DIG. 44, 97, 114.1, 114.3, 114.4, 114.5

[56] References Cited

U.S. PATENT DOCUMENTS

| | | | |
|---|---|---|---|
| 4,339,399 | 7/1982 | Nutter | 261/112 |
| 4,396,559 | 8/1983 | Nutter | 261/112 |
| 4,788,040 | 11/1988 | Campagnolo et al. | 422/191 |
| 4,820,455 | 4/1989 | Kunesh et al. | 261/113 |
| 4,909,967 | 3/1990 | Binkley et al. | 261/97 |
| 5,051,214 | 9/1991 | Chen et al. | 261/97 |
| 5,132,055 | 7/1992 | Alleaume et al. | 261/97 |
| 5,192,465 | 3/1993 | Petrich et al. | 261/97 |
| 5,240,652 | 8/1993 | Taylor et al. | 261/97 |
| 5,250,234 | 10/1993 | Meyer et al. | 261/112.2 |
| 5,752,538 | 5/1998 | Billingham et al. | 261/97 |

Primary Examiner—Virginia Manoharan
Attorney, Agent, or Firm—David M. Rosenblum; Salvatore P. Pace

[57] ABSTRACT

A liquid distributor in the form of a tray or trough network is provided with a plurality of rows of apertures through which liquid descends. A predistributor trough predistributes liquid onto the rows of apertures and is provided with bottom and side openings from which the liquid is distributed onto the plate. The side openings are located proximally with respect to the bottom openings to enhance uniformity of velocity profile of the liquid.

8 Claims, 3 Drawing Sheets

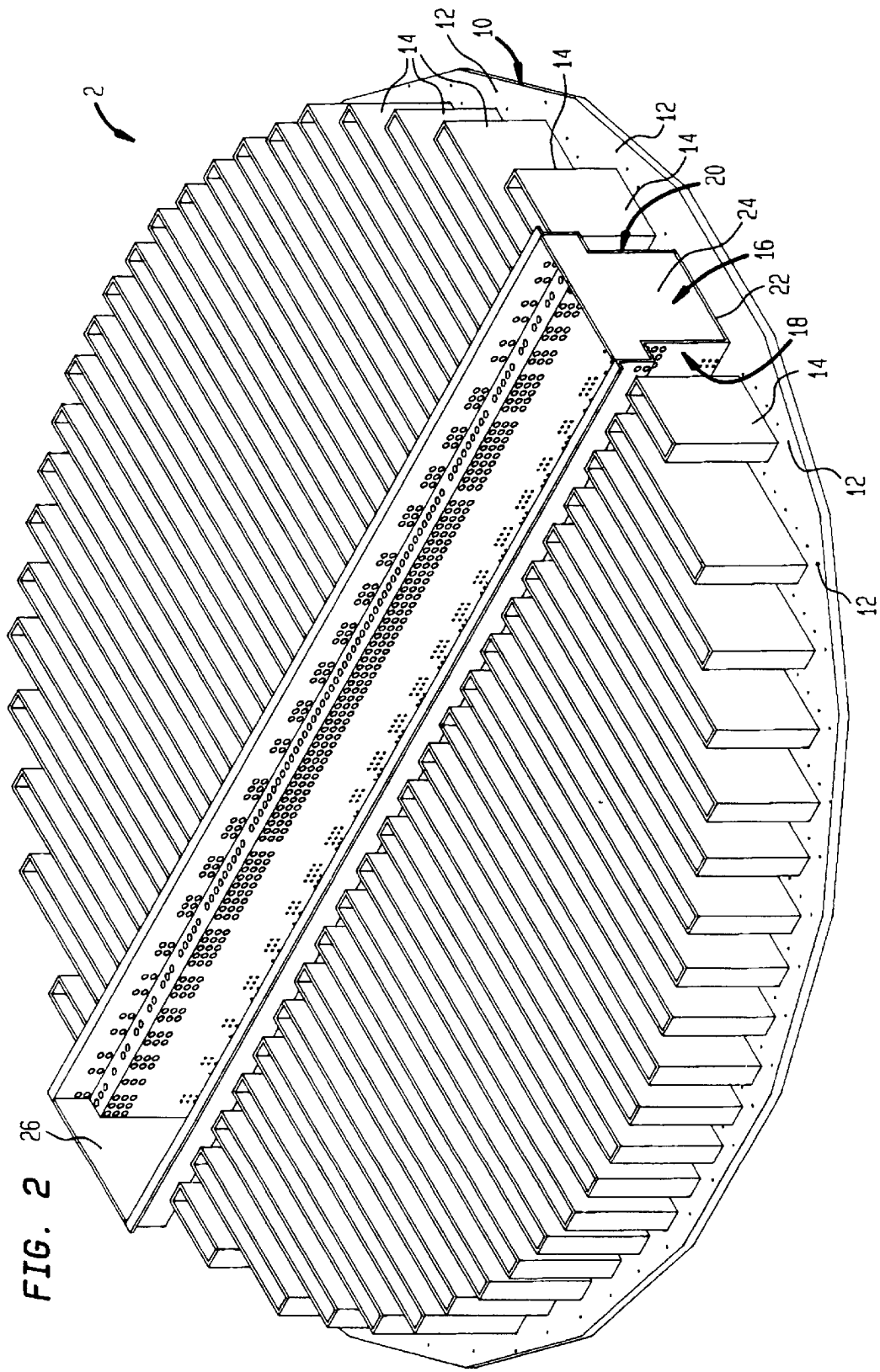

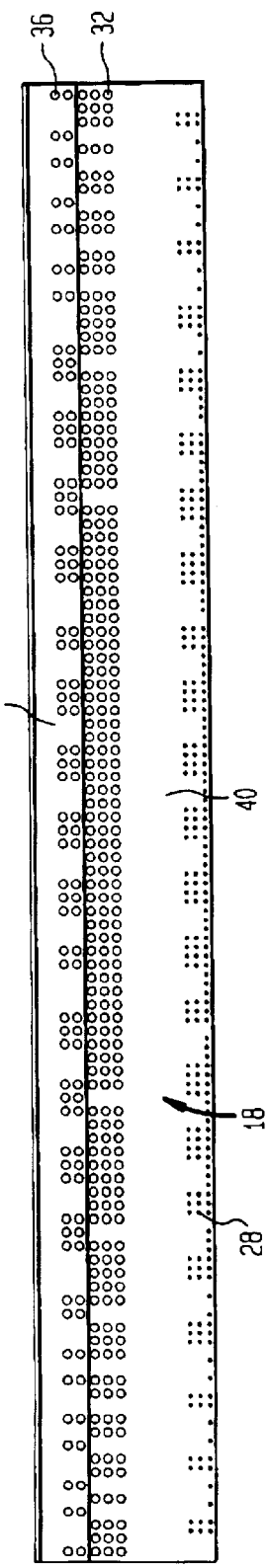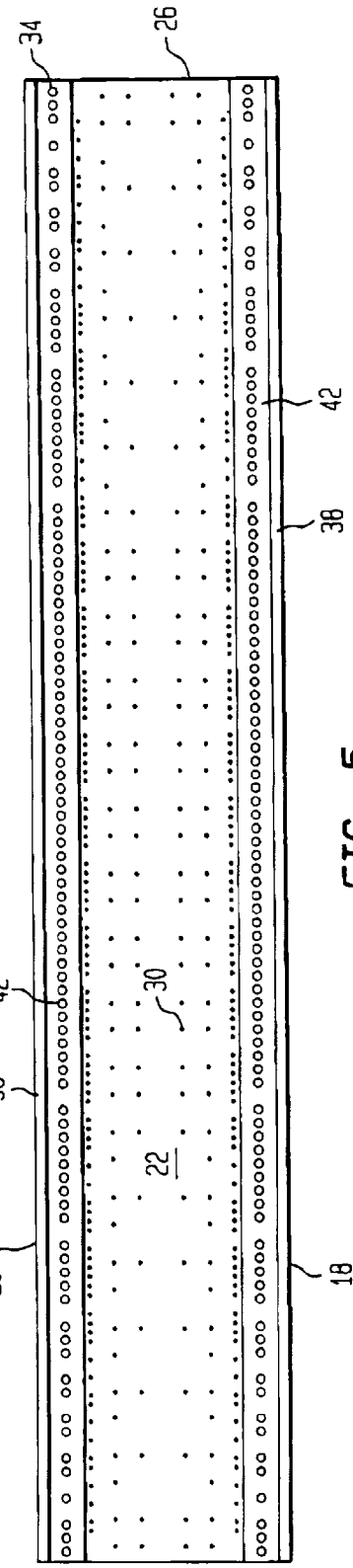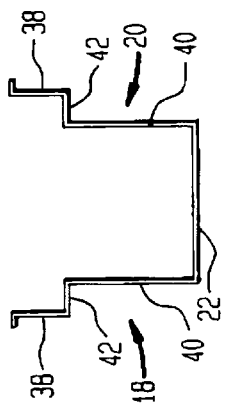

LIQUID DISTRIBUTOR

BACKGROUND OF THE INVENTION

The present invention relates to a liquid distributor that is designed to be situated between packed beds in order to ensure mixing and redistribution of liquid. More particularly, the present invention relates to such a liquid distributor having a predistributor trough for distributing the liquid to rows of apertures. More particularly, the present invention relates to such a liquid distributor in which the predistributor trough has bottom and side openings from which liquid is distributed onto the liquid distributor and rows of apertures.

Distillation is effected by contacting vapor and liquid phases of the mixture to be separated in a distillation column. The vehicle for effectuating contact and therefore, the mass transfer between liquid and vapor phases, can be by a variety of known random and structured packings that are arranged in beds within the distillation column. The beds function to allow formation of a liquid film that descends through the packing. A consequence of the formation of the film is that the liquid tends to spread out in the packing and flow towards the walls of the column. Additionally, any maldistributions of liquid that are retained as liquid is fed from bed to bed lead to changing liquid concentrations as one travels across the beds in a transverse direction of the column.

Liquid distributors are provided between packing beds in order to ensure mixing and redistribution of the liquid. Liquid distributors can be in the form of liquid distributor trays or liquid distributor troughs that are employed with liquid collectors to collect the descending liquid phase of the mixture. Known liquid distributor trays consist of a plate having rows of apertures for the liquid to descend from the plate to the next underlying bed of packing. Additionally, rows of vapor risers are provided between the rows of apertures to allow a vapor phase of the mixture to ascend through the distributor tray. Liquid distributor troughs include a trough network having parallel, elongated troughs provided with rows of apertures. The distributor troughs are spaced to allow for the ascending vapor phase of the mixture to pass between troughs.

In order to introduce liquid onto the liquid distributor in some orderly fashion and such that liquid is distributed to all the rows of apertures, a predistributor trough can be provided between the vapor risers of a distributor tray or overlying the trough network of a distributor trough. Predistributor troughs are provided with bottom openings to distribute liquid onto the distributor tray or trough network. In order to accommodate high flow rates, it is common to notch the lateral top edges of the predistributor trough so that liquid may overflow the predistributor trough directly onto the distributor tray or trough network in an orderly fashion. It is also known in the art to size the bottom openings so that a greater open area exists at central locations thereof. The reason for this is that for a circular distributor tray design or a trough network designed to fit within a cylindrical distillation column, there are more apertures at such central locations and hence, a greater flow requirement to accommodate the increased number of apertures.

The inventors herein have identified problems in prior art predistributor trough designs that tend to promote maldistributions of liquid. One problem centers on the bottom openings. The flow of liquid from the bottom openings induces a velocity distribution, within the liquid flowing across the distributor tray or troughs of the distributor trough, in which liquid velocity is greatest near the surface of the tray or trough network. This velocity distribution induces a greater flow to outlying apertures. Another problem is that during overflow operation, the flow of liquid from the regularly spaced notches induces an even flow rate of liquid from the predistributor trough. Such an even flow rate can cause liquid to circulate around the distributor tray rather than being equally distributed to all of the apertures.

As will be discussed, the present invention provides a liquid distributor in which the redistributor trough is designed to promote uniform velocity profiles of liquid and therefore uniform distribution of the liquid.

SUMMARY OF THE INVENTION

The present invention provides a liquid distributor tray that comprises a plate having a plurality of rows of apertures from which liquid descends through the plate. A plurality of vapor risers are located between the rows of apertures to allow the vapor to ascend through the plate. A predistributor trough is provided for distributing the liquid to the rows of apertures. The predistributor trough has bottom and side openings from which the liquid is distributed onto the plate and thus the rows of openings. The side openings are located at least proximal to the bottom openings to enhance uniformity of velocity profile of the liquid. In another aspect of the present invention, that will be discussed in more detail hereinafter, overflow operation is accommodated by overflow openings that have a greater open area at central locations of the predistributor trough so that the liquid flow rate distributions that are produced during normal operation are retained during overflow operation.

BRIEF DESCRIPTION OF THE DRAWINGS

While the specification concludes with claims distinctly pointing out the subject matter that Applicants regard as their invention, it is believed the invention will be better understood when taken in connection with the accompanying drawings in which:

FIG. 2 is a perspective view of a liquid distributor tray in accordance with the present invention.

FIG. 3 is a side elevational view of a predistributor trough used in predistributor tray illustrated in FIGS. 1 and 2;

FIG. 4 is a top plan view of FIG. 3; and

FIG. 5 is an end view of FIG. 3.

DETAILED DESCRIPTION

Figure 1:
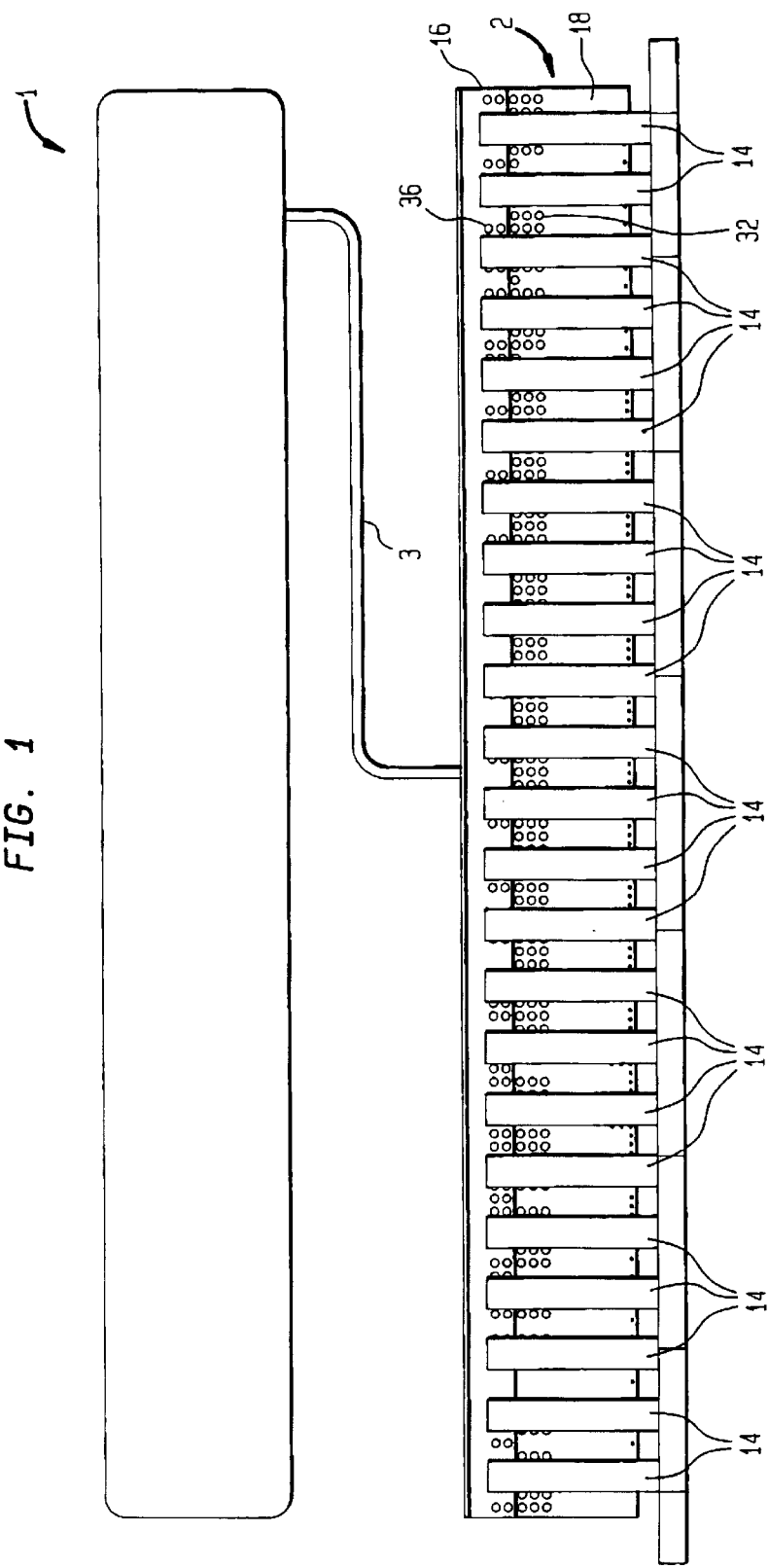
FIG. 1 is a side elevational view of a liquid collector and distributor tray in accordance with the present invention.

With reference to FIG. 1, a liquid collector tray 1 is illustrated that is used to collect liquid descending within a distillation column from an overlying bed of packing, not illustrated. Liquid collected within liquid collector 1, can be piped to a liquid distributor tray 2 in accordance with the present invention by way of a pipe 3. Although the present invention is illustrated and discussed with reference to a liquid distributor of the "tray" type, it is understood that the discussion herein and the claims have equal applicability to a liquid distributor having a trough network. Moreover, the present invention also has application to a "tray" type liquid distributor having known, "hatted" vapor risers.

With additional reference to FIG. 2, liquid distributor tray 2 includes a plate 10 having rows of apertures 12. A plurality of vapor risers 14, attached to plate 10, are located between the rows of apertures 12 to allow vapor to ascend through plate 10 to the overlying bed of packing. Pipe 3 discharges the collected liquid into liquid predistributor trough connected to vapor risers 14.

With additional reference to FIGS. 3, 4 and 5, predistributor trough 16 is formed by side, bottom and end walls 18, 20, 22, 24 and 26. Side openings 28 are defined within side walls 18 and 20 in a proximal location to bottom wall 22. In this regard, bottom wall 22 is provided with bottom openings 30. Side openings 28 and also, preferably bottom openings 30, are arranged to provide a greater open area in distributor through 16 at central locations of plate 10 so that the flow rate of liquid increases at central locations of plate 10. Since the open area of plate 10 is greater at such central locations, the increase in flow rate will tend to enhance the uniformity of flow of the liquid across plate 10. In the illustrated embodiment this is accomplished by grouping openings to have a greater number at the central locations than at end locations. The size of openings could also be increased at central locations with or without the grouping of the openings. The actual arrangement of openings will of course depend upon the size of the liquid distributor tray to and the liquid flow rates involved. The illustrated arrangement of side and bottom openings 28 and 30 were experimentally determined.

In the illustrated embodiment, side walls 18 and 20 have a stepped configuration, each with two upper and lower vertical sections 38 and 40 connected by a horizontal section 42. Overflow openings 32, 34, and 36 can be provided above side openings 28 and within upper and lower vertical sections 38 and 40 and horizontal sections 42 to allow liquid to flow from predistributor trough 16 at high liquid flow rates. The illustrated stepped configuration advantageously allows clearance to be provided between vapor risers 14 and side and overflow openings 28, 32, 34 and 36.

It is to be noted that the pattern or grouping of overflow openings 32, 34, and 36 is in the same pattern as that for side openings 28 so that there will be an increased open area at central locations of predistributor trough 16. Further, overflow openings 32, 34, and 36 are of greater number and diameter than side and bottom openings 28 and 30 to help prevent liquid from overflowing predistributor trough at such high flow rates. A further point is that overflow openings 32, 34, and 36 in a possible embodiment could have the same size as side and bottom openings 28 and 30 and/or also be provided in the same number and distribution of side openings 28.

While the present invention has been described with reference to preferred embodiment, as will occur to those skilled in the art, numerous changes, additions and omissions may be made without departing from the spirit and scope of the present invention.

We claim:

1. A liquid distributor comprising:

a plurality of rows of apertures defined in a plate from which liquid descends;

a plurality of vapor risers located between said rows of apertures to allow vapor to ascend through said plate; and a predistributor trough located above said rows of apertures for distributing said liquid to said rows of apertures;

said predistributor trough having two opposed side walls, a rectangular bottom wall connecting said side walls, bottom openings defined in said bottom walls and side openings defined in said side walls from which liquid is distributed onto said plate and said rows of apertures;

each of said side walls having an outwardly stepped configuration to provide clearance between said side openings and said vapor risers and said side openings located at least proximal to said bottom openings to enhance uniformity of velocity profile of said liquid.

2. The liquid distributor of claim 1, wherein said side openings are configured to provide a greater open area at central locations of said plate.

3. The liquid distributor of claim 2, wherein the bottom openings are also configured to provide the greater open area at the central locations.

4. The liquid distributor of claim 2, further comprising overflow openings defined in said predistributor trough located above said side openings and configured to provide an increased open area at said central locations corresponding to said greater open area of said side openings.

5. The liquid distributor of claim 4, wherein said greater and increased open areas are provided by increasing the number of side openings at said central locations.

6. The liquid distributor of claim 4, wherein said greater and increased open areas are provided by increasing the number of overflow openings at said central locations.

7. The liquid distributor of claim 4, wherein there are more overflow openings than side openings and also each of said overflow openings is of greater diameter than that of said side openings.

8. The liquid distributor of claim 4, wherein:

each of said sidewalls has two upper and lower vertical sections connected by a horizontal section;

said overflow openings are defined in said upper and lower vertical sections and said horizontal section.

\* \* \* \* \*